United States Patent [19]

Dushane et al.

[11] Patent Number: 5,449,319
[45] Date of Patent: Sep. 12, 1995

[54] DWELLING HEATING AND AIR CONDITIONING SYSTEM

[75] Inventors: Steven D. Dushane, 17170 Los Alamos St., Granada Hills, Calif. 91344; Kenneth K. Anderson, Simi Valley; Grant E. Bohm, Redding, both of Calif.

[73] Assignee: Steven D. Dushane, Granada Hills, Calif.

[21] Appl. No.: 227,121

[22] Filed: Jun. 10, 1994

Related U.S. Application Data

[62] Division of Ser. No. 88,767, Jul. 8, 1993, Pat. No. 5,348,078.

[51] Int. Cl.6 .............................................. B60H 1/24
[52] U.S. Cl. ..................................... 454/319; 454/335
[58] Field of Search ............... 454/315, 335, 319, 330, 454/331; 236/49.3

[56] References Cited

U.S. PATENT DOCUMENTS

| | | | |
|---|---|---|---|
| 2,540,958 | 2/1951 | Newton | 236/49.3 |
| 2,685,246 | 8/1954 | Saunders, Jr. | 454/315 |
| 2,761,371 | 9/1956 | Parrish | 454/315 X |
| 3,336,715 | 8/1967 | Savary | 454/330 X |
| 3,640,455 | 2/1972 | Romanelli | 236/49.3 |
| 3,777,974 | 12/1973 | Sparks | 236/49.3 |

*Primary Examiner*—William E. Wayner
*Attorney, Agent, or Firm*—Poms, Smith, Lande & Rose

[57] ABSTRACT

A retrofittable heating and air conditioning system for a single family dwelling including a heater and air conditioning furnace system connected to individual zones of a building by a series of output ducts. Each opening of a duct to an individual zone may have a unique, fully sealing, controllable output register assembly. Also, in each zone is a thermostat for sensing the zone temperature and for providing a means for the user to control the temperature of that zone. The system further includes a master controller with such temperature controlling features as a universal zone controller, individual zone controllers, and a timer. Finally, the system includes a central controller for controlling the register assemblies and the air conditioning, heating, and fan with respect to instructions set by the individual zone registers and the master controller.

18 Claims, 14 Drawing Sheets

FIG. 2
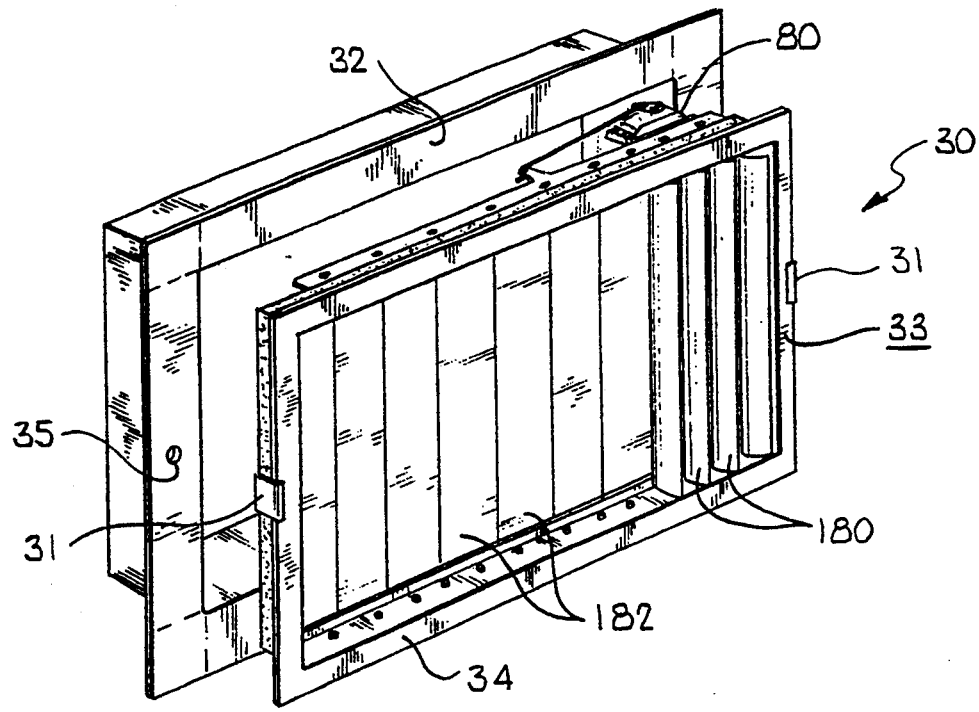
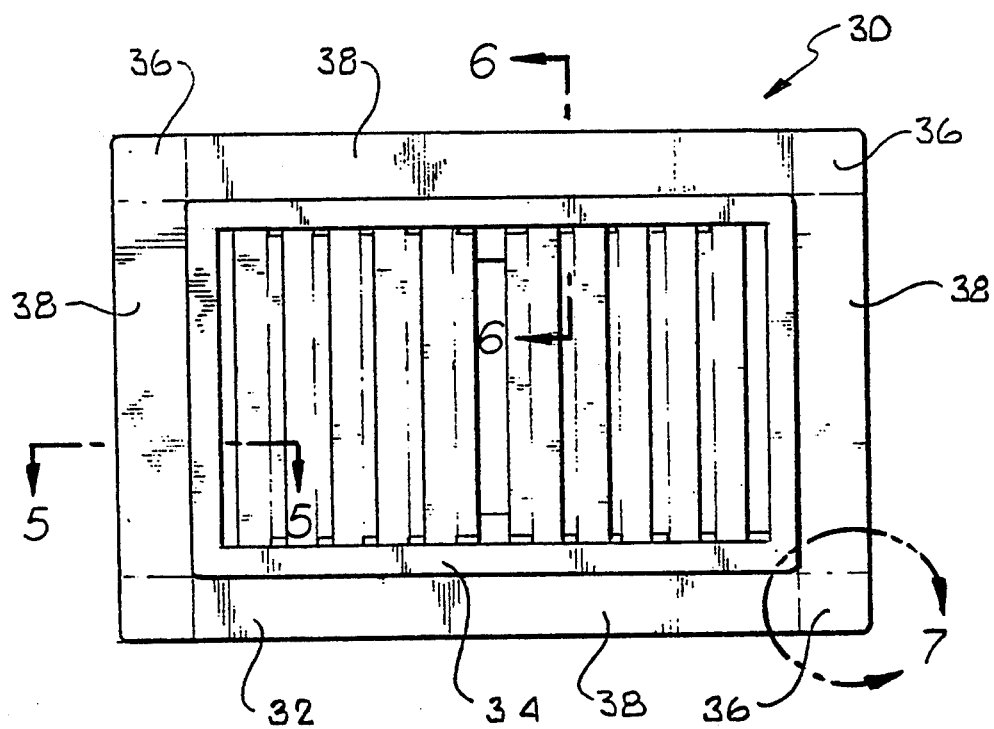
FIG. 3

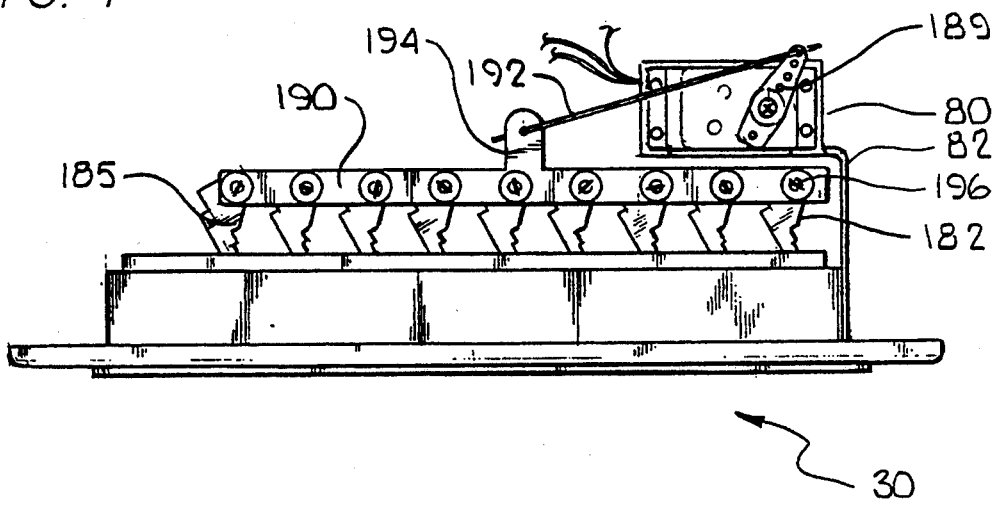
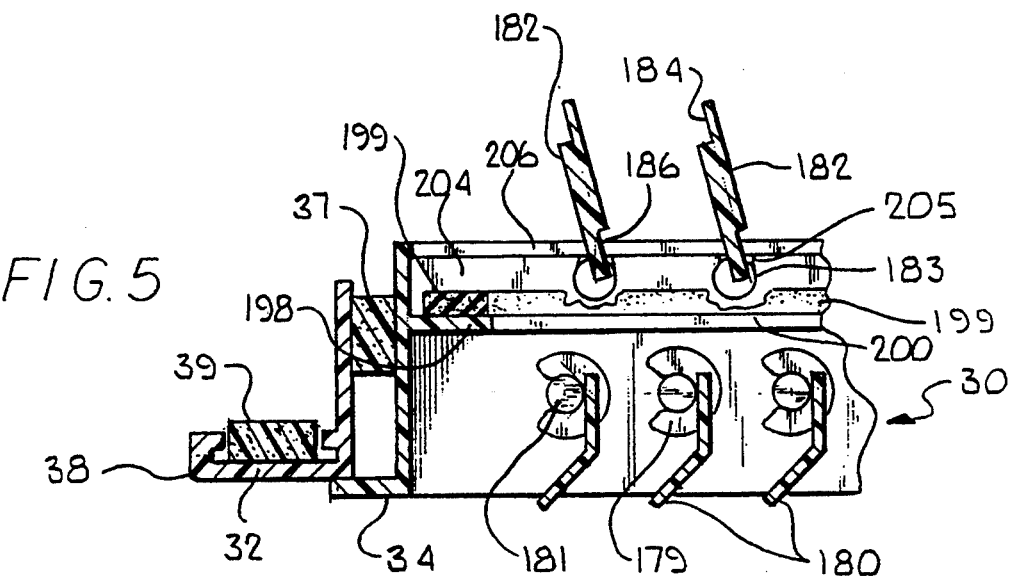
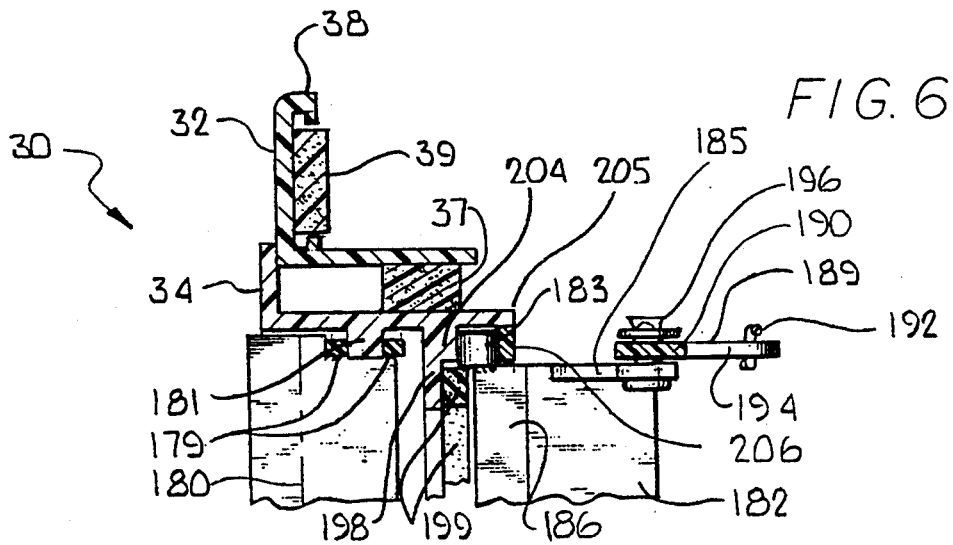

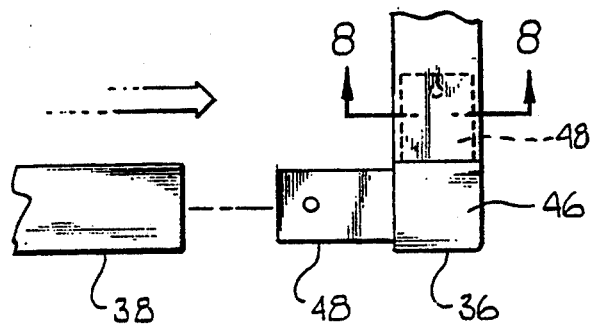
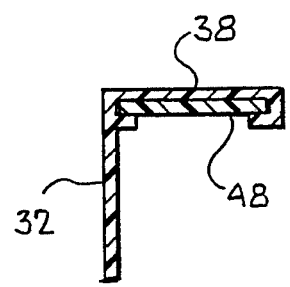
FIG. 7  FIG. 8
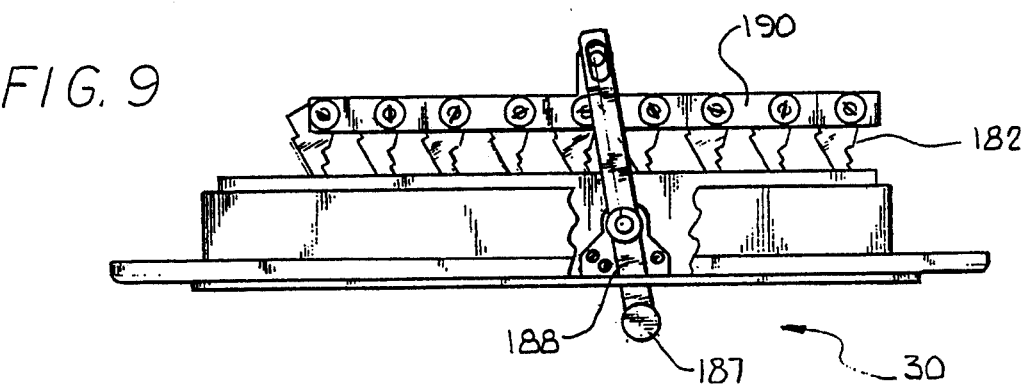
FIG. 9
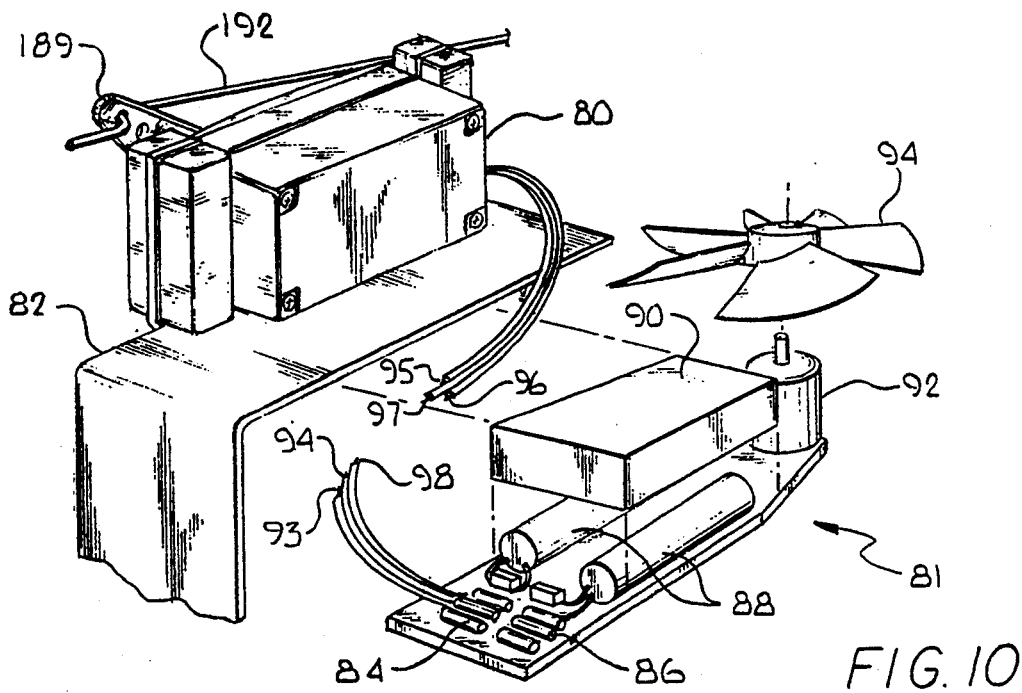
FIG. 10

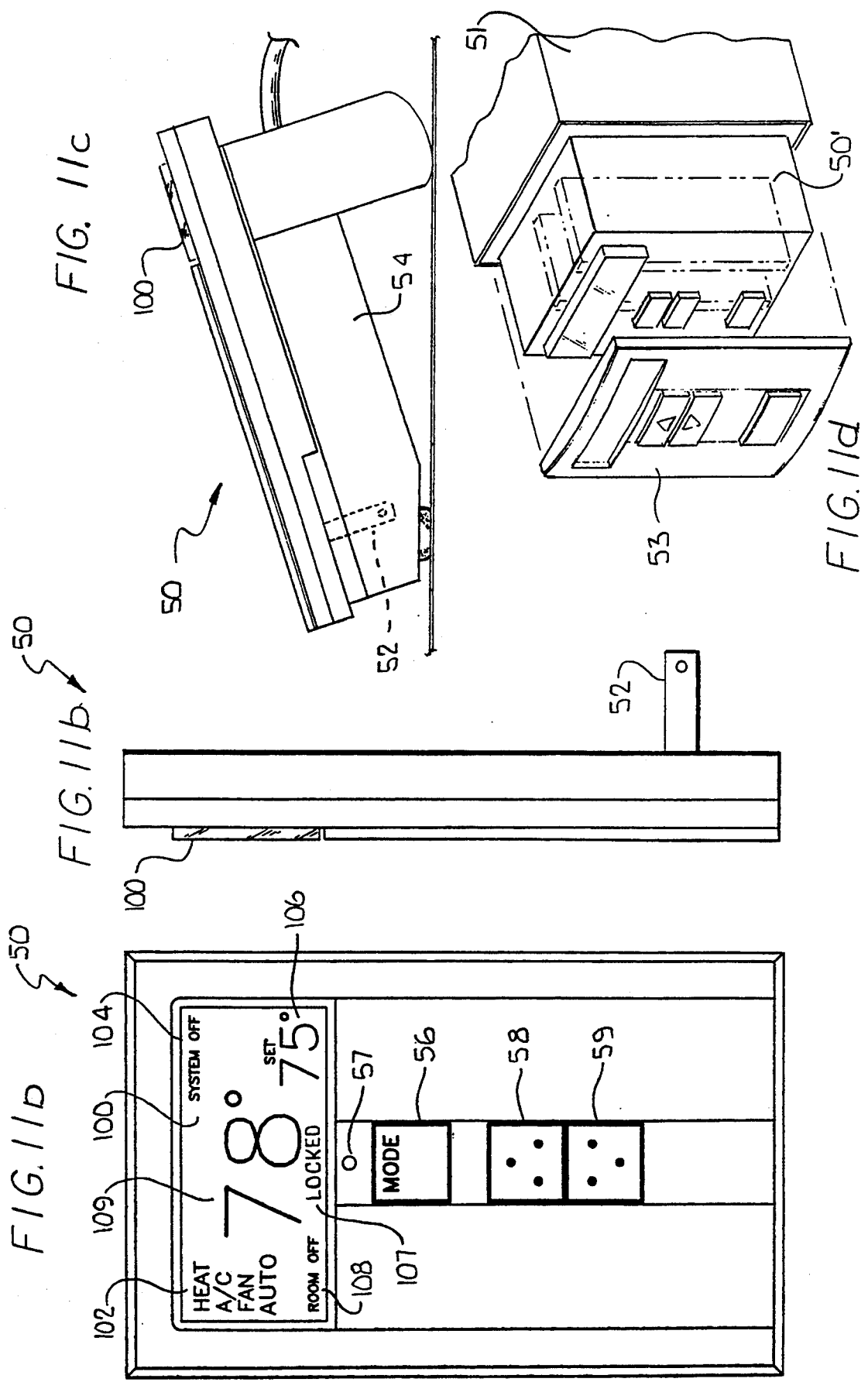

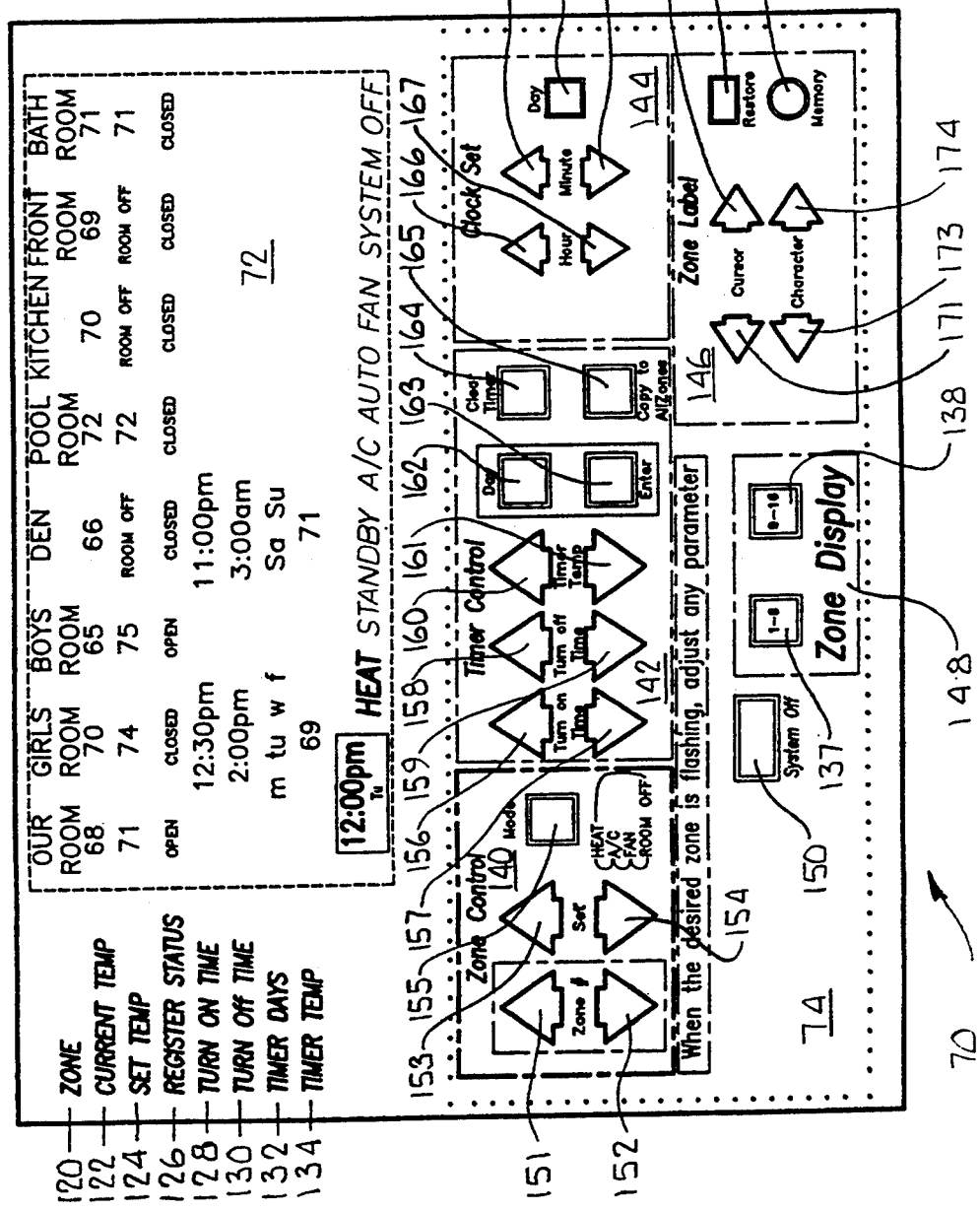

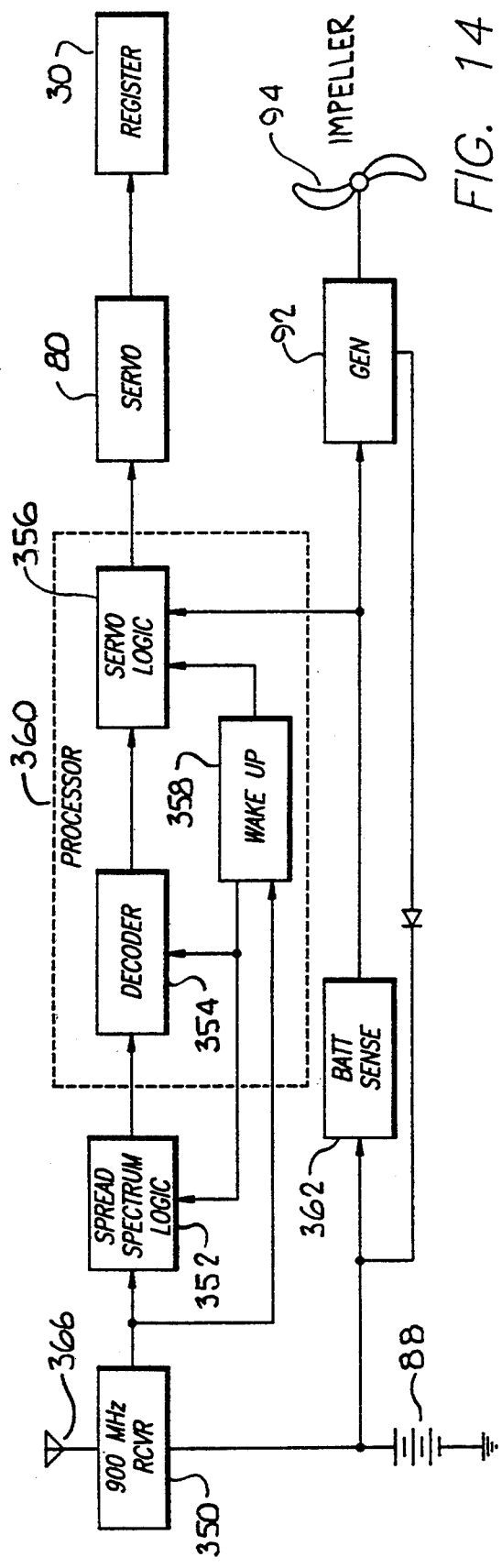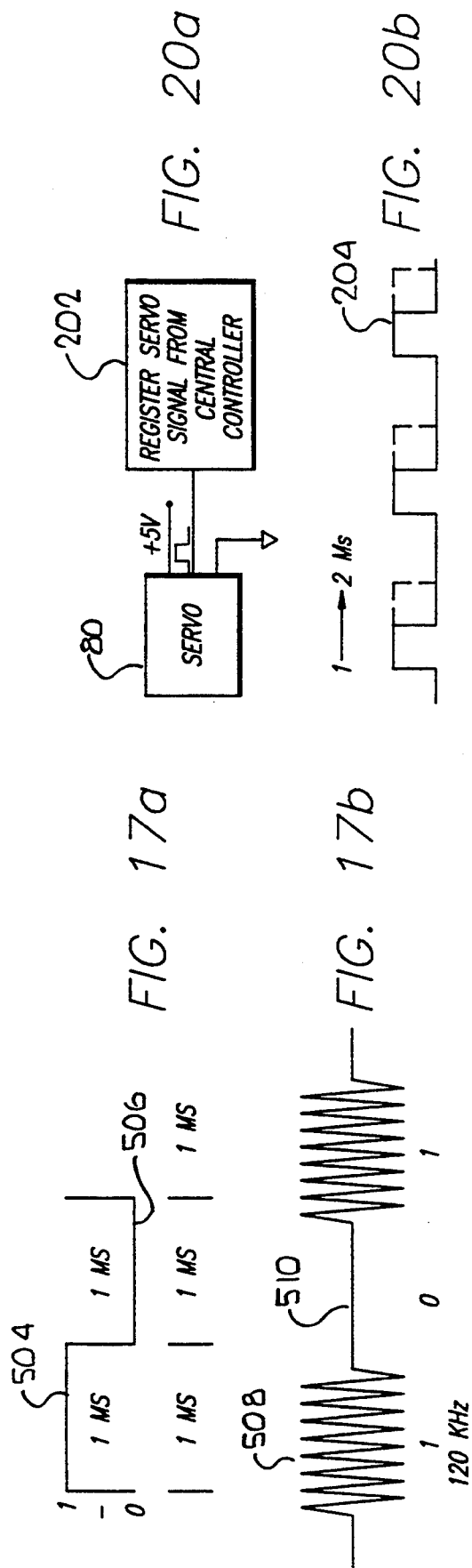

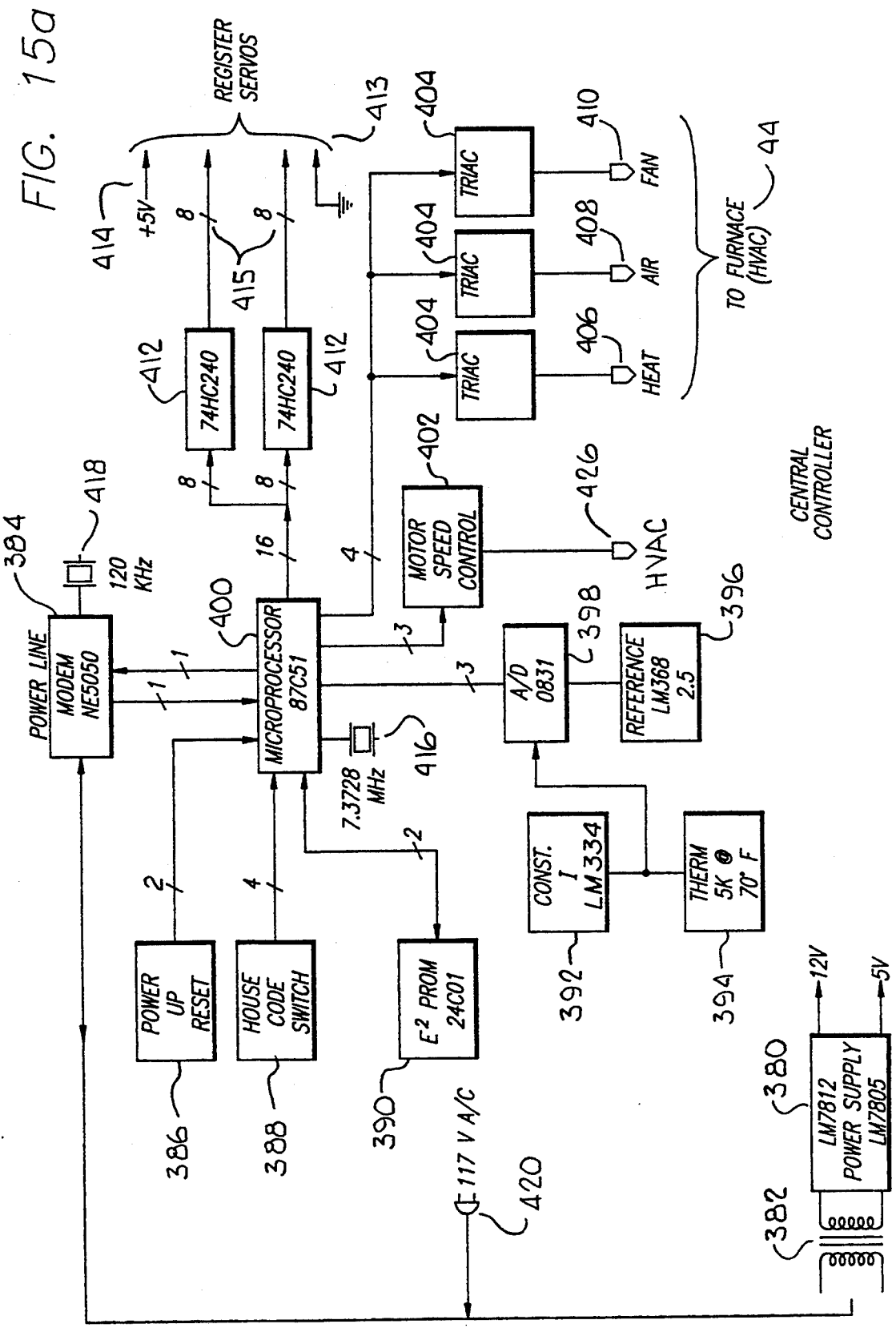

FIG. 18

CENTRAL CONTROLLER

| INST TYPE | | | PARITY | END |
|---|---|---|---|---|
| AA | 1 | HC | TC | CKSUM | BB |

| AA | 2 | HC | TC | STATUS | SET TEMP | CKSUM | BB |

| AA | 3 | HC | STATUS | CKSUM | BB |

| AA | 4 | HC | TC | OUTLET | CKSUM | BB |

| AA | 20 | HC | MASTER OUT CODE | CKSUM | BB |

| AA | 21 | HC | ON or OFF HVAC STATUS | MODE | CKSUM | BB |

THERMOSTAT (RESPONSE)

| 55 | HC | TC | STATUS | SET TEMP | CURRENT TEMP | CKSUM | BB |

MASTER CONTROLLER (RESPONSE)

| CC | HC | THERM COUNT | STATUS | SET TEMP | CKSUM | BB |

① INSTRUCTION TYPE
1=REQUEST STATUS
2=UPDATE STATUS
3=BROADCAST COMMAND (TO ALL THERMOSTATS)
4=SET TEMP OFFSET (FACTORY SET)
20=QUERY MASTER CONTROLLER
21=INSTRUCTIONS TO MASTER CONTROLLER
② ☐ EACH BLOCK IS AN 8 BIT WORD IN HEX
③ AA=CONTROLLER
④ 55= THERMOSTAT
⑤ BB=END OF TRANSMISSION
⑥ CC=RESPONSE FROM MASTER CONTROLLER.
⑦ HC=HOUSE CODE
⑧ TC=VENT OR REGISTER OR THERMOSTAT CODE

DWELLING HEATING AND AIR CONDITIONING SYSTEM

This is a division of application 08/088,767 filed Jul. 8, 1993, now U.S. Pat. No. 5,348,078.

FIELD OF THE INVENTION

This invention relates to a system for controlling heating and air conditioning within a building.

BACKGROUND OF THE INVENTION

It is known to supply and control heating and ventilation from a centralized source. Buildings are often built with dampers and temperature sensors within air ducts. These dampers can be controlled from a centralized location. Examples of this technology may be found in U.S Pat. No. 4,585,163 (the '163 patent), U.S. Pat. No. 4,732,318 (the '318 patent), U.S. Pat No. 4,406,397 (the '397 patent), and U.S. Pat. No. 4,646,964 (the '964 patent). A common problem of the devices cited in these patents is the difficulty and expense involved in fitting an already constructed building with a heating and air conditioning system. This problem of retrofittability is solved with the present invention.

One of the reasons the devices cited in prior art are difficult to fit into existing buildings is that their dampers are located within the air ducts. Most of the these dampers are single blade devices. Single blade dampers need significant amounts of space (about equal to the width or height of a damper, depending on the pivot direction) to reach a fully opened state. The space requirement, therefore, dictates that these single blade dampers be positioned within the actual duct, rather than at the duct outlet or opening. This single blade design can be seen in the '318 patent, the '964 patent, the '397 patent, and the '163 patent.

U.S. Pat. No. 4,258,877 (the '877 patent), issued Mar. 31, 1981, to White, discloses an electric, motor driven damper, with thermostatic switch control, for opening and closing air ducts. The actuator also shows the damper position from outside the duct, by the use of an indicator arm on the damper pivot. Like those devices mentioned above, the White damper blade must be located within the actual air conditioning duct. This is because the damper blade is comprised of an L-shaped member having a relatively long leg and a relatively short, slightly curved leg. The relatively long leg is rotatably mounted to a shaft which is mounted perpendicular to the flow of air. Therefore, the relatively long leg of the damper blade would be parallel or at an angle to the sides of the air conditioning duct. This would prevent this damper blade from being used directly behind the duct opening. Since the damper must be located within the air conditioning duct, retrofitting is impractical.

U.S. Pat. No. 2,790,372, issued Mar. 30, 1963, to Cooper, discloses an electric, motor driven damper, controlled by a thermostat, to increase the flow of cool/heated air into the individual rooms. There is no provision for controlling the temperature of the incoming air or for controlling the overall system temperature. The damper in this patent only functions in conjunction with an air supply duct which extends horizontally above the ceiling of a room and has a duct opening on its lower side. This single blade damper requires significant amounts of room to swing open. Therefore, like those dampers discussed above, this damper would not be easily retrofittable and, additionally, would be limited to a specific type of duct.

There are many methods of regulating individual room air temperature. The invention disclosed in the '318 patent issued Mar. 22, 1988, to Osheroff, regulates individual room air temperature by increasing the velocity of the heated or cold air through the ducts. The invention disclosed in the '397 patent, issued Sep. 27, 1983, to Kamata, regulates air temperature in an individual room by using an air quantity control device in each branched duct of a central heating and air conditioning system. The air quantity delivered to each room is monitored by velocity sensors in each branch duct, and the command sent to the central blower unit for either increased or decreased air volume. The invention disclosed in the '163 patent, issued Apr. 29, 1986, to Cooley, regulates air temperature by monitoring air volume.

It also should be noted that most of the prior art systems have sensing devices which are located within the air ducts. This is true in the '318 patent, the '397 patent, the '163 patent, and the '964 patent. This requirement makes retrofitting difficult.

The '964 patent, issued Mar. 3, 1987, to Parker, addresses the opening and closing of a duct, and the air temperature in the duct. The room temperature is set by a thermostat in the individual room, and commands the duct to open and close, based on the difference between room temperature and air duct temperature, measured by a sensor in the duct. This system cannot control individual room temperature by commanding the heater/air conditioner to add cooler air or heat, and relies on the main thermostat, for the overall temperature condition.

Accordingly, a principal object of the present invention is to provide an improved heating and air conditioning system which is easily retrofittable to a single family dwelling with a single duct system.

BRIEF SUMMARY OF THE INVENTION

In accordance with the present invention, a heating and air conditioning system for a single family dwelling, preferably includes a heater and air conditioning furnace system, a series of output ducts extending from the furnace system to individual rooms or zones of the dwelling, controllable output register units (often called vent units) at each duct opening into a zone, thermostats for each individual zone, and a central controller for controlling the furnace system and the individual zone registers. The system preferably also includes a master controller for selecting temperature conditions for each zone and for sending signals to a central controller.

This heating and air conditioning system is designed to be easily retrofitted into existing homes. One reason for the ease of retrofitting the present invention is its unique register assemblies. Preferably, these register assemblies have specially designed exterior frames made of side and corner units which allow the register to fit almost any duct opening, and an inner register unit. The exterior frame compensates for uneven walls such that the inner register unit remains undistorted. These register assemblies replace existing system dampers which require installation within existing air ducts.

The inner register unit of the invention has fully sealing, interlocking inner vanes or blades which are attached to a blade bar that may be electronically controlled by a central controller. Each register unit may be provided with a small motor (or servo) which controls its open/close state. The servo unit may be hardwired to or controlled via radio signals by the central controller. A second set of snap-in, adjustable blades may be provided at the front of the inner unit for directing air as desired within the local room or zone.

Thermostat units, preferably in each room, would monitor the room temperature. They would preferably be able to communicate with the central controller over house AC wiring or via a radio type transmitter and receiver. They would also provide the user with a source for controlling for the individual room temperature.

Additionally, the system would preferably include a master controller which could include an alternate source of control for the individual zones, a centralized source of control for the zones combined, and a timing means of control. The master controller would preferably communicate with the central controller over existing house AC wiring or via radio signals.

In addition to controlling and communicating with the room thermostats, the master controller and the register assemblies, the central controller may control the actual heating and air conditioning furnace.

The preferred embodiments of the invention may also include the following additional features:

1. The register assemblies may be either manually controlled or servo controlled.

2. The servo controlled register assemblies may be hardwired to the central controller or controlled via a radio-type receiver.

3. The individual zone thermostat may be mounted in a standard electrical outlet, mounted in a specially designed junction box in the wall, or connected to a table stand.

4. The frame of the inner register unit (interior frame) may be mounted to the exterior frame of the register unit by way of a molded serrated pull tap or a steel spring clip.

A major advantage of the present invention is that this system is easily retrofitted into a currently existing building. This is due, in part, to its unique register units or vent covers which can be placed at the opening of the air duct rather than a damper which is fitted within the actual duct. The retrofitability is also due to the ability of the system to communicate over standard building AC wiring or via radio signals.

Another major advantage of the present invention is having the temperature of an individual zone measured within the actual zone. The present invention measures the temperature at the individual zone thermostat. This feature provides more accurate temperature control within the zone than those systems which measure the temperature from within the air duct.

Other objects, features and advantages of the present invention will become apparent from a consideration of the following detailed description, and from the accompanying drawings.

BRIEF DESCRIPTION OF THE DRAWINGS

FIG. 2 is a perspective partially exploded view of a servo controlled register assembly incorporating certain features of the present invention;

FIG. 3 is a front view of the register assembly;

FIG. 4 is a top view of a servo controlled register assembly;

FIG. 5 is a cross-sectional top view of the side of the register assembly taken along line 5—5 of FIG. 3;

FIG. 6 is a cross-sectional side view of the top of the register assembly taken along line 6—6 of FIG. 3;

FIG. 7 is an enlarged perspective view of the corner coupling unit of the exterior register frame taken along line 7—7 of FIG. 3;

FIG. 8 is a cross-sectional view taken along lines 8—8 if FIG. 7 including an extruded side unit;

FIG. 9 is a perspective partially cutaway view of a manually controlled register assembly;

FIG. 10 is perspective view of a self powered, radio frequency controlled unit for the register;

FIG. 11a is a front view of an individual zone thermostat;

FIG. 11b is a side view of an individual zone thermostat;

FIG. 11c is a side view of an individual zone thermostat with a table stand;

FIG. 11d is a view of an individual zone thermostat mounted in a junction box;

FIG. 12a is a master controller including details of the display screen and the control pad;

FIG. 12b is a front view of the master controller with a pivoted panel or door covering the control pad switches;

FIG. 12c is a side view of the master controller with the door shut;

FIG. 14 is a block circuit diagram of the servo unit at each self powered, radio frequency controlled register;

FIG. 15a is a block circuit diagram of a hardwired central controller;

FIG. 17a is a diagram of converted digital signals;

FIG. 17b represents high frequency signals to be transmitted over AC 120 volt house wiring;

FIG. 18 is a depiction of the sequences of control signals transmitted by the central controller, the master controller, and the thermostat units;

FIG. 20a is a block diagram of the connection between each of the servoregisters and the central controller; and FIG. 20b is a variable pulse width signal for servo motor control.

DETAILED DESCRIPTION OF THE PREFERRED EMBODIMENTS

I. General

Figure 1:
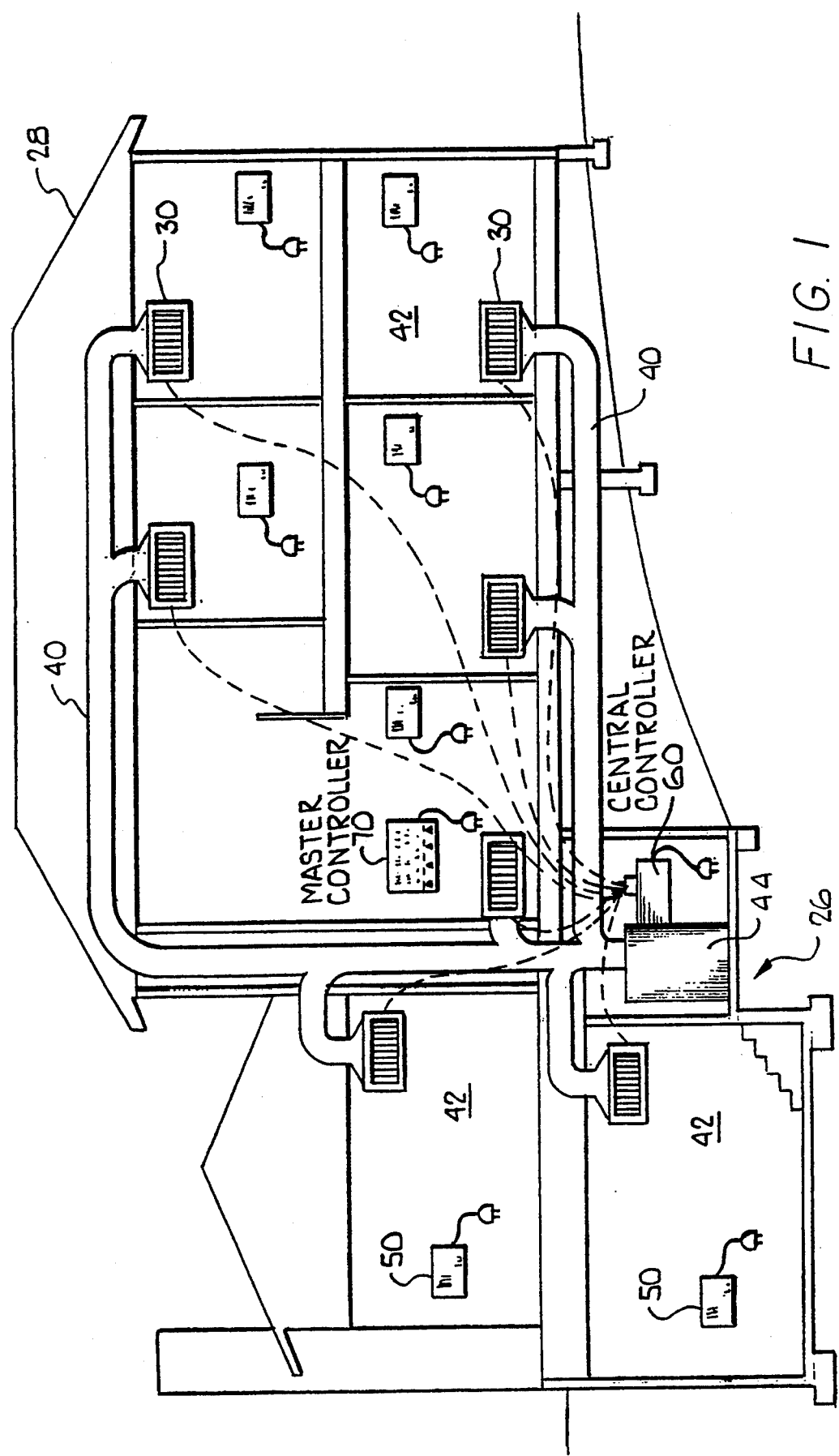
FIG. 1 is a schematic illustration of a building having individual control zones connected by air ducts, each zone having its own thermostat and register assembly, the building also having a master controller and a central controller.

Referring more particularly to the drawings, FIG. 1 is a depiction of a dwelling heating and air conditioning system 26 installed in a building 28. The building 28 in accordance with a preferred embodiment of the invention may be a dwelling 28; however, other types of buildings such as businesses or recreational facilities could employ the same system. The dwelling 28 may contain multiple individual rooms or zones 42. The zones 42 are preferably connected by a series of ducts 40 for supplying heating and air conditioning to the zones 42. In each zone 42 there may be one or more openings of the duct 40. During installation of the system 26, each opening is preferably covered by a register assembly (or vent assembly) 30. Additionally, each zone 42 preferably contains a thermostat 50 which may be connected to a central controller 60. The building 28 may also be equipped with a master controller 70 which may communicate with the central controller 60. The central controller 60 preferably controls the actual heating, air conditioning, and fan unit 44 of the dwelling heating and air conditioning system 26.

II. Register Assembly

A. Exterior Frame

Each zone 42 of a building 28 may contain a register assembly 30 which includes an exterior frame 32. FIG. 2 is a perspective view of a register assembly 30 controlled by a servo motor 80, and detailing the exterior, duct adapting, register frame (exterior frame)32, and an inner register unit 33. The exterior register frame 32 (also shown in FIG. 3) serves to accommodate uneven wall openings; and it is preferably composed of corner members 36 and side members 38. The corner member 36 (as shown FIG. 7) may have a square central portion 46 with two legs 48 extending from the central unit 46 and at right angles to each other. The legs 48 are thinner than the central portion 46, of the corner members 36 and extend outwardly from it. The legs 48 may then be inserted into the L-shaped extruded side members 38 (as shown in both FIG. 7 and FIG. 8).

The exterior, duct-adapting, register frame 32 is uniquely suited to the retrofitting feature of the present invention. The corner members 36 may be made of a standard size. The side members 38 are preferably made by an extrusion process involving forcing heated plastic through a die. The extruded side unit 38 can be made in a continuous process, and then cut to fit any size duct opening. An alternative embodiment of the exterior frame 32, albeit less economical, would be to use a molded frame or molded side units. Extruding, however, is more economical than the expensive process of molding an entire frame or four side units. Additionally, if a molded frame or side unit was used, many sizes would be needed to fit the various sized duct openings used in residential and commercial buildings. The side members 38 may be cemented or otherwise bonded to the corner units 36 to form complete exterior frames 32.

Finally, as shown in FIG. 2, one or more fastening holes 35 can be included on the exterior register frame 32. These holes 35 can be used to secure the register assembly 30 to the wall or surface surrounding the duct opening, or to the outwardly ranged ends of the duct.

B. Inner Register Unit

The inner register unit 33 (as shown in FIG. 2) is preferably comprised in part of a frame (interior frame) 34, outer directional vanes or blades 180, and inner sealing vanes or blades 182. The outer blades 180 have been removed at the left in FIG. 2 to show the inner vanes 182. FIG. 2 shows one embodiment of the present invention including air directional blades (air deflectors) 180 in the foreground and the surface-engaging, interlocking, sealing blades 182 in the background (discussed below in connection with FIG. 5). FIG. 3 is a front view of the register unit 30. In this view the frame of the inner register unit (interior frame) 34 is positioned within the exterior, wall compensating and duct-adapting, register frame 32.

FIG. 5 and FIG. 6 further detail the interface between the exterior frame 32 and the interior frame 34. These frames are preferably sealed together by way of interior/exterior rubber compliant sealing strips 37 which may be bonded to the outer wall of the interior frame 34. The exterior frame 32 is sealed to a wall or other surface by way of a compliant rubber strip 39 which is bonded within a recess of the extruded side units 38 exterior frame 32 (as seen in FIG. 5 and 6). These seals are necessary to prevent passage of air through gaps between the register unit frames (34 and 32) and the exterior frame 32 and the surface to which the register unit is mounted.

As shown in FIG. 2, the interior frame 34 may be held securely within the exterior frame 32 by a molded serrated pull tab 31. An alternative embodiment could include a spring steel clip to position the interior frame 34 within the exterior frame 32. Other fastening devices and seals known in the art would allow the interior frame 34 to be secured and sealed within the exterior frame 32 and the register to control air flow even if the wall or structure that the exterior frame 32 rests against is not flat.

FIG. 4 shows a top view of a servo controlled register assembly 30. (The actual mechanics of the servo unit 80 will be discussed in more detail in connection with FIG. 10 and FIG. 14.) The servo unit 80 may be used to control the position of the servo lever 189. In the preferred embodiment of the invention the lever 189 has only two positions, open and closed, corresponding to the signals represented in FIG. 20b; however, other embodiments could include three or more positions or a continuous spectrum of positions.

The servo lever 189 is preferably pivotally attached to each end of a stiff wire or thin connecting rod 192. The other end of the stiff wire 192 may be pivotally attached to the blade bar extension 194 which preferably extends perpendicularly from the blade bar 190. An alternative embodiment of the invention could have the wire 192 attached directly to the blade bar 190. Another alternative embodiment of the invention could use a manual lever 188 (as detailed in FIG. 9). The manual lever 188 would preferably include a handle or knob 187 extending into the room. Further, the manual lever 188 would preferably be pivotally connected to the blade bar extension 194.

1. Inner Interlocking Vanes

The blade bar 190 preferably has pivotally attached to it an array of inner, interlocking vanes or blades 182 for selectively shutting off the air flow through the register assembly 30. The inner vanes 182 are preferably attached to the blade bar 190 on the outer edge by way of blade pivot extensions 185 (as shown in FIG. 4 and FIG. 6) which may extend perpendicularly from the upper edges of the blades 182. The blade pivot extensions 185 are pivotally attached to the blade bar 190 by the pivot screw 196.

FIG. 5 details a horizontal cross section of the frame of the inner register unit (interior frame) 34 including the inner, interlocking vanes 182. These vanes 182 are preferably pivotally attached to the interior frame 34 by pivot means 183. In one embodiment of the invention the pivot means includes a small cylindrical pivot disk 183 which is attached to one end of an interlocking inner vane 182. The cylindrical pivot disk 183 would then fit into a receiving notch 205 of a receiver bar 204. A receiver bar cover strip 206 may be used to cover the receiving notches 205 with the cylindrical pivot disks 183 "snapped in" so that the disks 183 are held in place. Alternatively, the notches may be configured so that the pivot disks snap into the notches so that the receiver bar cover strip is not needed. Other pivot means 183 such as pivot screws and other known pivot arrangements may be employed.

The interlocking vanes 182 are preferably rectangular-shaped and may have dimensions, for example, of 4½" high and 1¼" wide. The dimensions are preferably such that the blades extend past the opening 200 defined by the interior frame blade ridge 198. The interior frame blade ridge 198 preferably has affixed to it a rubber or foam blade compliant seal 199. When the blades 182 are in the closed position, they rest against the blade complaint seal 199 so that no air can pass.

The horizontal cross sections of the interlocking vanes 182 preferably have an essentially rectangular with cut-out rectangular portions at opposite diagonal corners (184 and 186). This cross section may be achieved by specifically extruding or molding the individual inner vanes 182, by molding a rectangular unit and "cutting out" the corner sections, or by combining two flat sections. If two flat sections were combined, each section, for example, be 4½" long, ⅞" wide, and approximately 1/16" thick. The flat sections would then be coupled in a offset fashion so that about ¼" of the width of each section overlaps the other flat section.

At the edge of the inner vane 182 by the cylindrical pivot disk 183, the cut-out portion forms an "under-engaging" surface 186. At the other end of the vane 182, the cut-out portion forms an "over-engaging" surface 184. When the vanes 182 are in the closed position, the over-engaging surface 184 rests on the nearest underengaging vane surface 186. In combination with the vanes 'overextension' of the perimeter onto the compliant seal, this produces a fully sealing engagement which effectively shuts off the flow of air through the register assembly 30.

2. Outer Air-deflecting Blades

Also shown in FIG. 5 and FIG. 6 is an array of air-deflecting, outer vanes or blades 180 which may be pivotally attached to the interior frame 34. These blades 180 may be manually set to direct the flow of air to the desired location within the room 42 in which the register assembly 30 is located. The air-deflecting outer blades 180 may be molded or extruded in either a bent or a straight configuration. These blades 180 should to fit in the interior frame 34 of the inner register unit 33, for example, 5" in length At both ends of each blade 180, the blades are pivotally mounted to the frame 30 by pivot pins 181 mounted either on the blades 180 or the frame 30, which snap into mating C-shaped "snap in" receiver 179 mounted on the frame 30 or the blade 180, respectively. This allows for easy assembly and replacement of broken vanes 180. Further, it allows the vanes 180 to be positioned so that the air deflects left or right.

C. Control of the Register Unit

As discussed in connection with FIG. 4, the interlocking vanes 182 are pivotally connected to a blade bar 190. The blade bar 190 may be controlled by a manual lever 188 (as detailed in FIG. 9), or it may be controlled electronically by a servo unit 80. If the blade bar 190 is controlled by a servo unit 80, the servo unit may be connected directly or indirectly via a power assembly 81 and receiving circuit 86, see FIG. 10, to the central controller 60.

1. Hardwired

As shown in FIG. 10, the servo unit 80 has three input wires: a ground wire 95, a power wire 96, and a pulse width wire 97 for receiving a variable signal. In the directly connected electronic embodiment, these wires may be directly "hardwired" to the central controller 60 (at 413,414, and 415 in FIG. 15a). The wires may run through or alongside the ducts 40.

2. Radio Controlled

Alternatively, the indirect or radio controlled electronic embodiment would include a self-contained power source 81 and a receiving circuit 86 to the servo 80. The receiving circuit 86 preferably receives signals emitted from a radio-type transmitter located in the central controller 60, as discussed below in connection with FIG. 15b. This embodiment would not require "hardwiring" and therefore would add to the ease of retrofitability.

The servo unit 80, as shown in FIG. 10 is preferably fixed to a motor bracket 82. Under or behind the bracket 82, and electronically connected to the servo 80, is the power source 81 which would be used in the self-contained power embodiment. The power source includes batteries 88, the charge of which is maintained by an impeller 94 which is connected to a motor generator 92. The impeller 94 rotates as air passes which causes the generator 92 to charge the rechargeable lithium cells or other batteries such as sealed lead acid cells 88. The lithium cells 88 need to be trickle-charged. However, they are preferable to nicad batteries which have shorter shelf lives than the lithium batteries. The lithium cells 88 are connected to circuit 84 which selectively supplies power to the servo 80 and includes a battery sensor 362 of FIG. 14.

FIG. 14 is a block diagram of the control circuit for a servo equipped register 30. When the battery sensor 362 senses that the batteries 88 need to be charged, a signal is sent to the servo logic 356. The servo 80 then opens the register assembly 30. As air passes through the assembly 30, the impeller 94 turns. This causes the generator 92 to charge the batteries 88.

FIG. 14 further shows the communication means between the register assembly 30 and the central controller 60 in the wireless embodiment. Each servo unit 80 may be equipped with a modular "phone-type" pigtail (approximately one foot long) connected to a female jack. This pigtail may be hardwired directly to the central controller 60 (wires 413,414 and 415 of FIG. 15a). Alternatively, the pigtail wires (95, 96 and 97) of the servo unit 80 may be connected to the power assembly wires (93, 98 and 94). These wires are preferably connected to a receiving circuit 86 (as seen in FIG. 10), which includes an antenna 366 and a 900 Mhz receiver 350 (as seen in FIG. 14). The receiving circuit 86 picks up signals emitted by the receiver/transmitter 424 of the central controller of FIG. 15b. When the central controller 60 transmits signals to the servo equipped register 30, the signal may then be sent to a wake up unit 358 within the processor 360 and to a spread spectrum logic device 352. The wake up unit 358 signals the spread spectrum logic unit 352, a decoder 354, and a servo logic unit 356. This spread spectrum logic 352 passes the signal to the decoder 354 within the processor 360 which in turn extracts or decodes the original information from the transmitted signal. The signal is sent to the servo logic unit 356 which in turn signals the servo unit 80 to either open or close the appropriate register unit 30.

FIG. 20a shows the hardwire connection (or implied radio signal connection) between the servo 80 which controls the register unit 30 (as shown in FIG. 2) and the central controller 60. The register servo signal from the central controller 60 sends a variable pulse signal 204 (as detailed in FIG. 20b). For example, if the pulse width is approximately 1 millisecond (Ms), the servo is closed. When the signal from the central controller to the servo 80 is 2 Ms, the register unit 30 is opened. Alternate embodiments could include additional, intermediate settings of the servo in which the register unit 30 is partially opened.

III. Individual Zone Thermostat

Figure 13A:
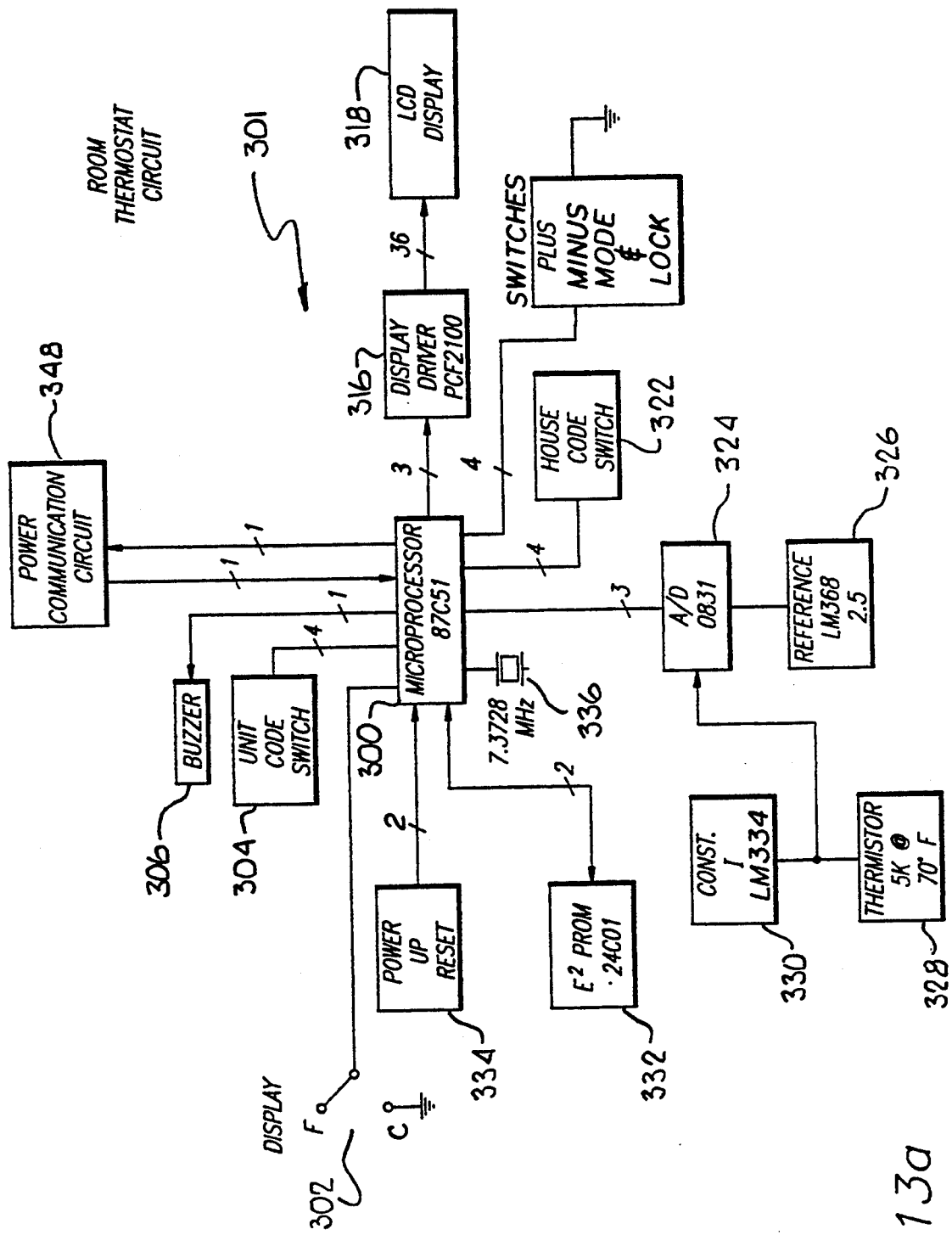
FIG. 13a is a block circuit diagram of the room thermostat circuit.
Figure 13B:
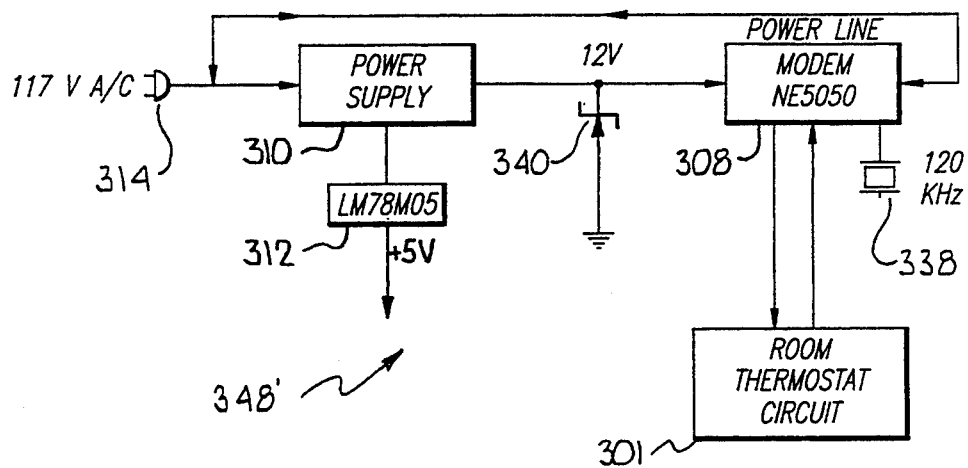
FIG. 13b is a block circuit diagram of the power/communication circuit of a hardwired room thermostat circuit.
Figure 13C:
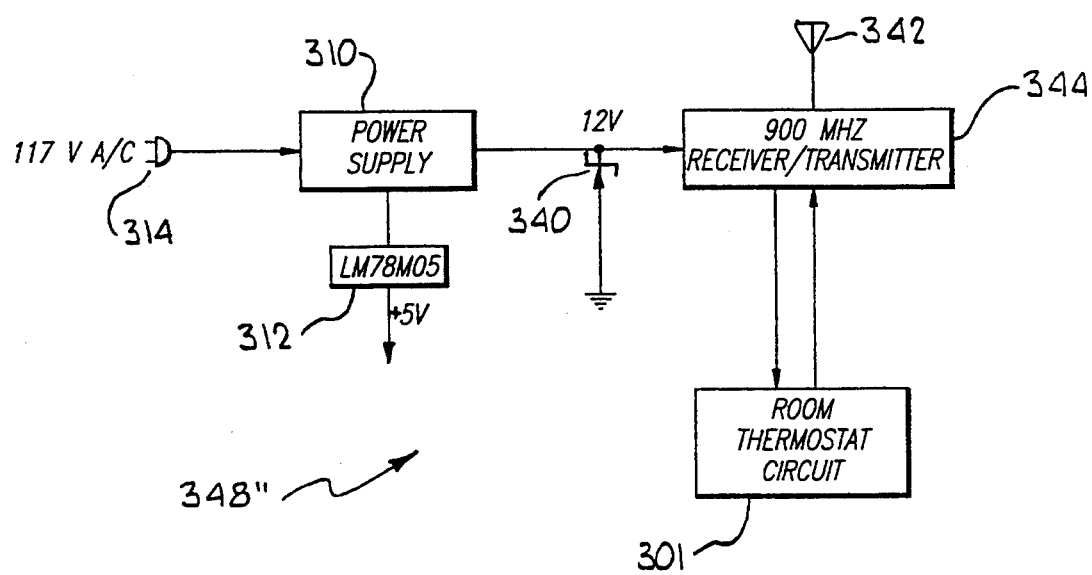
FIG. 13c is a block circuit diagram of a radio controlled room thermostat circuit.

Each zone 42 which contains a register unit 30 preferably includes an individual zone thermostat 50. Each individual zone thermostat 50 has preferred physical embodiments which are discussed below in connection with FIGS. 11a through 11d. The preferred control scheme of the individual zone thermostat circuit 301 is discussed below in connection with FIG. 13a. If the system 26 is hardwired, the power/communication circuit 348 of FIG. 13a is depicted as 348' of FIG. 13b. If the system is radio controlled, the power/communication circuit 348 of FIG. 13a is depicted as 348" of FIG. 13c. FIGS. 13a, 13b, and 13c will be discussed below.

A. Physical Characteristics

FIG. 11a details a preferred embodiment of the individual zone thermostat 50. The thermostat unit, as shown, may have a digital display screen 100 which could be, for example, approximately 1 inch by 2 inches. The display screen would preferably display information about the current status of the dwelling heating and air conditioning system 26 and the local zone 42. More specifically the display screen 100 of the thermostat unit 50 would highlight information pertinent to the individual room or zone 42. By way of example, information which could be displayed includes: the mode of operation of the system (heat, A/C, "auto" or fan) 102; the status of the system (on or off) 104; the temperature to which the room is set 106; whether the switch actuation is locked 107; the status of the room (on or off) 108; and the actual temperature of the room 109. Also included in the thermostat unit 50 are switch controls for setting the individual zone thermostat 50. By way of example, a mode button 56, an up button 58, and a down button 59 are included in the preferred embodiment of the invention. There is also a hole 57 to provide access to an inner switch for locking the switch actuation. This locking feature is advantageous for use in zones or rooms 42 which small children frequent.

As best shown in FIG. 11b, the individual zone thermostat 50 is equipped with a 110 volt blades or plug prongs 52 for coupling with the standard house receptacle. An alternative means of connecting the thermostat unit 100 to the main system would be the use of a table stand 54 (as best shown in FIG. 11c) into which the plug prongs 52 could be coupled. FIG. 11d depicts another embodiment of the present invention in which the thermostat 50' may be mounted in a junction box 51 and covered with a faceplate 53.

B. Control Circuit

FIG. 13a is a block diagram of the preferred embodiment of the room thermostat circuit 301. The room thermostat 50 is preferably controlled by a microprocessor 300 which may include 4K ROM (four thousand bytes of Read Only Memory). This microprocessor 300 receives information about the zone 42 in which the thermostat 50 is located including the temperature of the room as indicated by a circuit 328, the temperature at which the zone 42 is set, and information on the house and unit (or zone) codes supplied by circuits 322 and 304. The user uses buttons (56, 58, 59 of FIG. 11a), controlled by the switches 320, to set temperature and otherwise communicate with the room thermostat circuit 50. The buzzer 306 provides an audible "beep" to indicate when a button has been depressed. The microprocessor 300 is connected to a display driver 316 which controls the LCD display 318 of the thermostat 50 (as best shown in FIG. 11a). Finally, the room thermostat 50 has a circuit 348 for power and communication.

Information regarding the temperature of the zone 42 is supplied by a thermistor 328. The thermistor 328 changes resistance according to the temperature of the zone 42. A constant current 330 is supplied to the thermistor, and the varying output voltage is then converted from analog to digital form by a serial A/D converter 324. The reference circuit 326 emits a constant 2.5 V as a frame of reference for the system to calibrate the circuit and reliably determine the temperature of a zone 42.

Other information relevant to the microprocessor 300 is obtained from the house code switch 322, the unit or room code switch 304, and the push button switches 320. There is also a power up reset 334 for resetting the thermostat 50, an EEPROM 332, and a LCD display 318 and driver 316 to communicate information to the user. Any time there is a change, i.e. in set temperature or a mode change, this information is stored in the nonvolatile EEPROM. If there is a power outage causing the power-up reset to "reset", the EEPROM stored information is utilized when power is restored to place the unit in the last commanded state.

The power communication circuit 348 of the room thermostat circuit 301 is depicted in its hardwired embodiment as 348' of FIG. 13b. In this embodiment, the room thermostat circuit 301 uses the standard house AC wiring 314 for power and for communicating with the central controller 60. Power from the house AC wiring 314 enters the power supply 310. The power supply 310 supplies 5 volts to the room thermostat circuit 301 through a regulator 312. The power supply 310 also supplies 12 volts to the modem 308. The 12 volts are regulated by a zener diode 340. Communication signals may also be sent through the house wiring 314 to and from the modem 308. The modem is controlled by a timing crystal 338 to send and receive messages at 120 KHz. The modem 308 then transfers the message to the room thermostat circuit 301.

In a radio controlled system 26 the power communication circuit 348 of FIG. 13a is depicted as 348" of FIG. 13c. Like the hardwired system 26, the radio controlled system 26 is plugged into standard AC house wiring 314 for power. This power is fed into a power supply 310 which sends a regulated 5 volts to the room thermostat circuit 301. The power supply 310 also supplies 12 volts to a receiver/transmitter 344. The 12 volts are regulated by a zener diode 340. Communication is accomplished via an antenna 342 and a 900 MHz receiver/transmitter 344. The receiver 344 using spread spectrum logic, communicates the information to the room thermostat circuit 301. Information may also be sent from the room thermostat circuit 301 to the central controller 60 via the receiver/transmitter 344 and the antenna 342.

IV. Master Controller

FIG. 12a shows the master controller 70 of the system 26. The primary functions of the master controller 70 is to assist in the programmability of system operation and to change a zone's parameters remotely. Like the room thermostats 50, the master controller 70 may control the temperature of each individual room. The master controller 70, in its preferred embodiment, controls the set temperature of all the rooms to provide separate temperature environments, if desired. The master controller 70 may also control the set temperature in one or all of the zones 42 according to date and time.

A. Physical Characteristics

In the preferred embodiment, the master controller 70 has a display screen 72 and a control pad 74. As seen in FIG. 12b the control pad 74, when not in use, would be covered by door 76. As seen in FIG. 12c the door 76 will be connected by hinging means 79 at the bottom of the master controller 70. The door 76 would be held closed by pull tabs 78 which secure the door to the control pad 74.

The display screen 72 of the master controller 70 (as best seen in FIG. 12a) would include information regarding the status of the dwelling heating and air conditioning system. In FIG. 12a the door 76 is deleted for clarity. Such status information might include various zones 120, current temperatures 122, set temperatures 124, the register status 126, the time at which the system is set to turn on in a particular room 128, the time at which the system is set to turn off in a particular room 130, the days on which the timer is set to turn on 132, and the temperature to which the timer is set to adjust the system 134.

The master control switch pad 74 (as best seen in FIG. 12a) provides various controls for setting and adjusting the dwelling heating and air conditioning system. By way of example, the control pad 74 would include controls for the zone 140, the timer 142, and the clock 144. Other controls could be provided for turning the system on or off 150, for displaying various groups of zones 148, and for labeling the zones 146. The zone controls 140 would include up and down buttons (151 and 152) for the zone under consideration, up and down buttons (153 and 154) for setting the system temperature, and a mode button (155). The timer controls 142 would include up and down buttons (156 and 157) for the "turn on" time, up and down buttons (158 and 159) for the "turn off" time, and up and down buttons (160 and 161) for the timer temperature. Also preferably included in the timer controls 142 would be a button (162) for setting the day, a button (163) to enter the day, a button (164) to clear the timer, and a button (165) to copy the timer information to all zones. The clock set controls 144 would include up and down buttons (166 and 167) for the hour, up and down buttons (168 and 169) for the minute, and a button (170) to set the day.

The zone label controls 146 would include left and right buttons (171 and 172) for the cursor, left and right buttons (173 and 174) for the character, a button (175) to restore, and a button (176) to set the memory. The controls for the zone display 148 might include a button (137) for displaying zones 1 through 8 and a button (138) for displaying zones 9 through 15. There would also be a button (150) for turning the system off.

B. Control Circuit

Figure 19A:
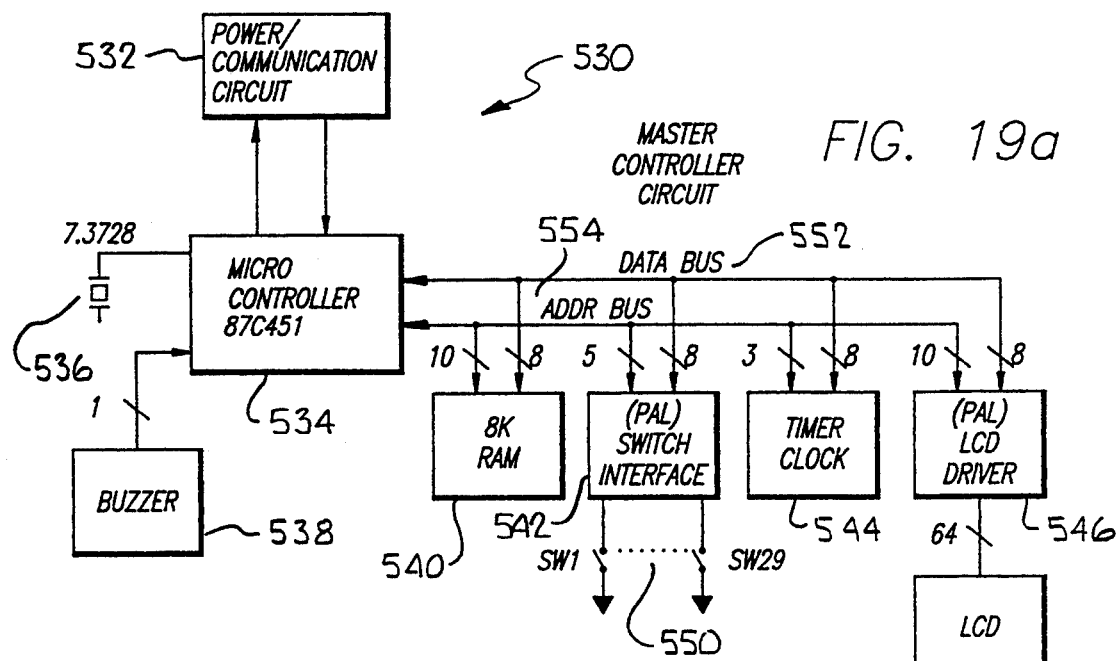
FIG. 19a is a block circuit diagram of the master controller circuit.

FIG. 19a shows a block circuit diagram of the master controller 70. The master controller circuit 530 is controlled by a microcontroller 534 with timing set by a quartz timing crystal 536. The microcontroller sends out and receives local information over the data bus 552 and address bus 554. The microcontroller circuit may also include 8K RAM 540 which the microcontroller 534 may access. Preferably them is also a PAL switch interface 542 which connects to the buttons on the master controller key pad 74 via switches 550. A timer clock 544 may be included to allow the user to control temperature at specific times of the day. A PAL LCD driver 546 and an LCD 548 make up the components for driving the display screen 72. Finally, a power communication circuit 532 is included to communicate with the central controller 60. The power communications circuit 532 of FIG. 19a is detailed in its hardwired embodiment as 532' of FIG. 19b. The power communication circuit 532 is detailed in its radio controlled embodiment as 532" of FIG. 19c.

Figure 19B:
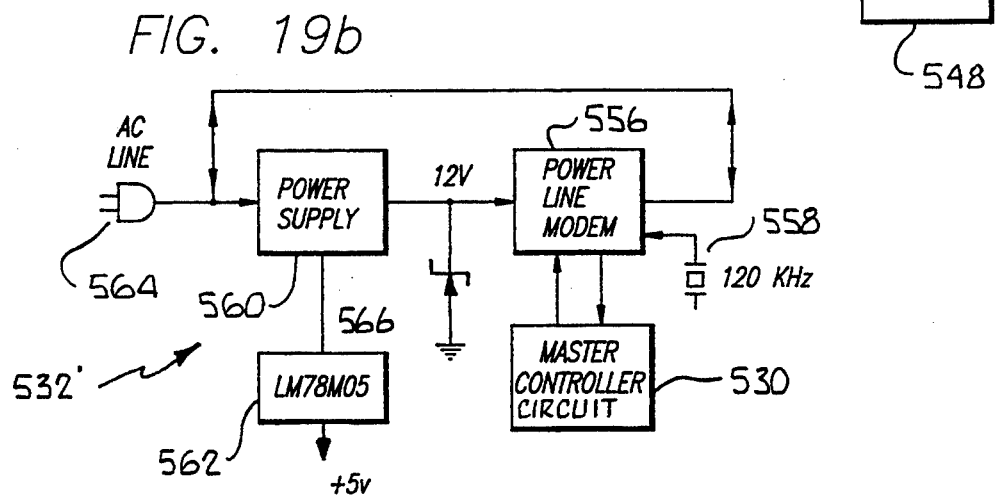
FIG. 19b is a block circuit diagram of the power/communication circuit of a hardwired master controller.

The hardwired embodiment of the power communication circuit 532 of the master controller circuit 530 is shown as 532' of FIG. 19b. In this embodiment, the master controller 70 communicates with the central controller 60 via standard house AC wiring 564. Power, also is supplied by the house wiring 564, enters the power supply 560 which sends a regulated 562 5 volts to the master controller circuit 530 and 12 volts to the power line modem 556. The 12 volts are regulated by a zener diode 566. Communication is achieved as signals are sent through the house wiring 564 to and from the modem 556. The modem 556 is controlled by a timing crystal 558 to send and receive messages at 120 KHz. The modem 556 then transfers the signal to the master controller circuit 530.

Figure 19C:
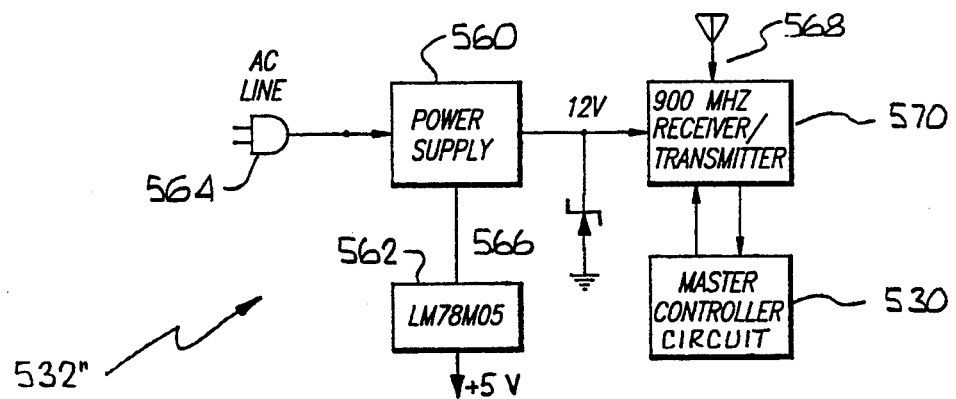
FIG. 19c is a block circuit diagram of a power/communication circuit of a radio controlled master controller.

In a system 26, operated by radio control, the power communication circuit 532 of FIG. 19a is represented as 532" of FIG. 19c. Like the hardwired system 26, the radio controlled system 26 is plugged into standard AC house wiring 564. The AC wiring 564 feeds power into a power supply 560. The power supply 560 provides 5 volts to the master controller circuit 530 and 12 volts to a receiver/transmitter 570. The 5 volts are regulated by the regulating circuit 562 and the 12 volts are regulated by a zener diode 566. Communication is achieved as an antenna 568 picks up signals which are received by a 900 MHz receiver/transmitter 570. The receiver 570 using spread spectrum logic, communicates the information to the master controller circuit 530. Information is also sent from the master controller circuit 530 to the central controller 60 via the receiver transmitter 570 and the antenna 568.

V. Central Controller

The central controller 60 preferably provides the central point of communication and control for the heating and air conditioning system 26. The central controller 60 may communicate with the individual zones 42 by sending out "instructions" to each thermostat 50. It may also receive "responses" as to the "temperature state" of each thermostat 50. The central controller 60 communicates with the master controller 70 by sending out "instructions" and receiving "responses." Another important function of the central controller 60 is to control the servo controlled room registers 30. Finally, the central controller 60 turns on and off the heater, air conditioning system, and fan 44 as needed, based on the "in condition" of the individual thermostats 50.

Figure 15B:
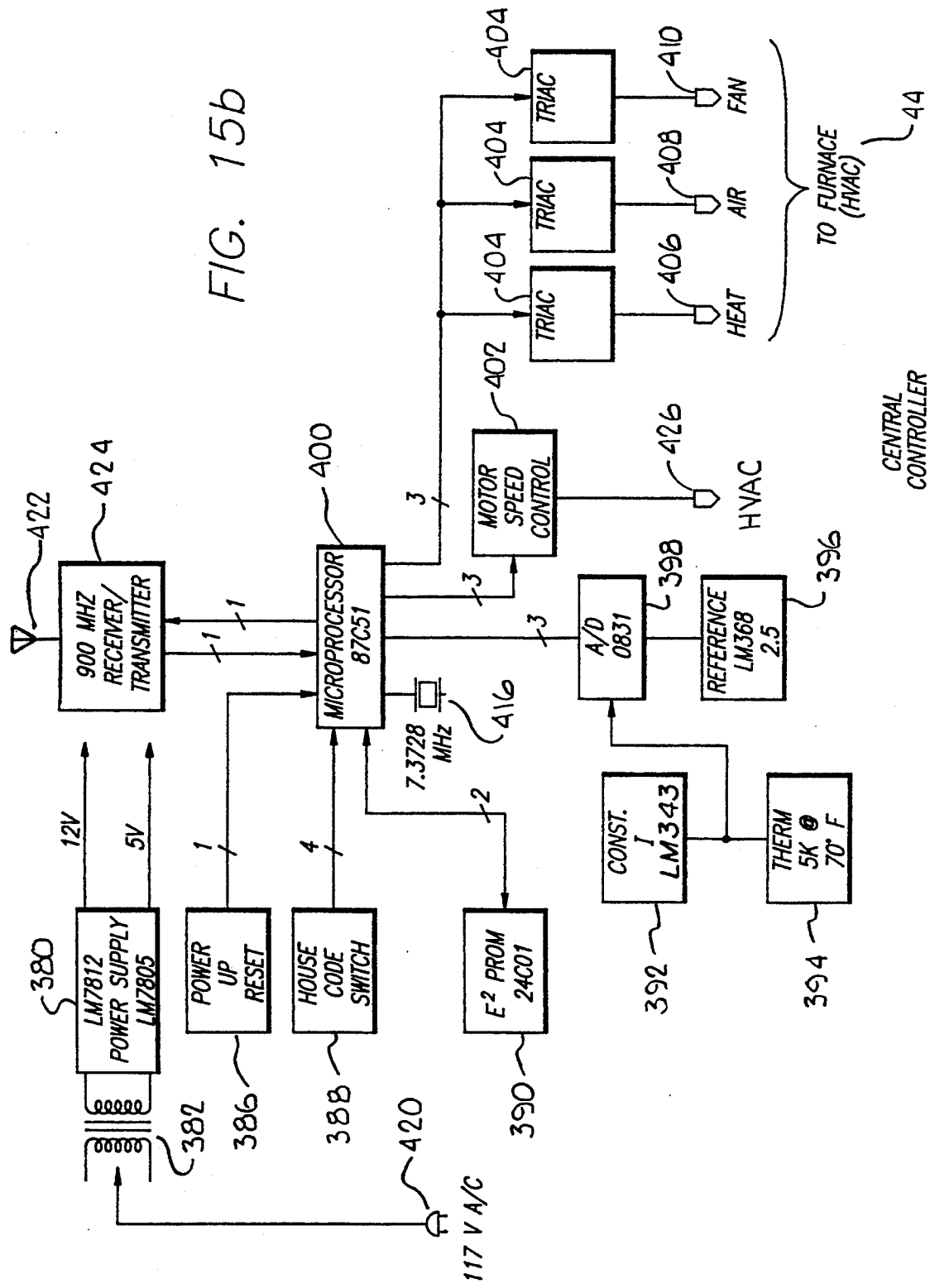
FIG. 15b is a block circuit diagram for a radio controlled central controller.
Figure 16:
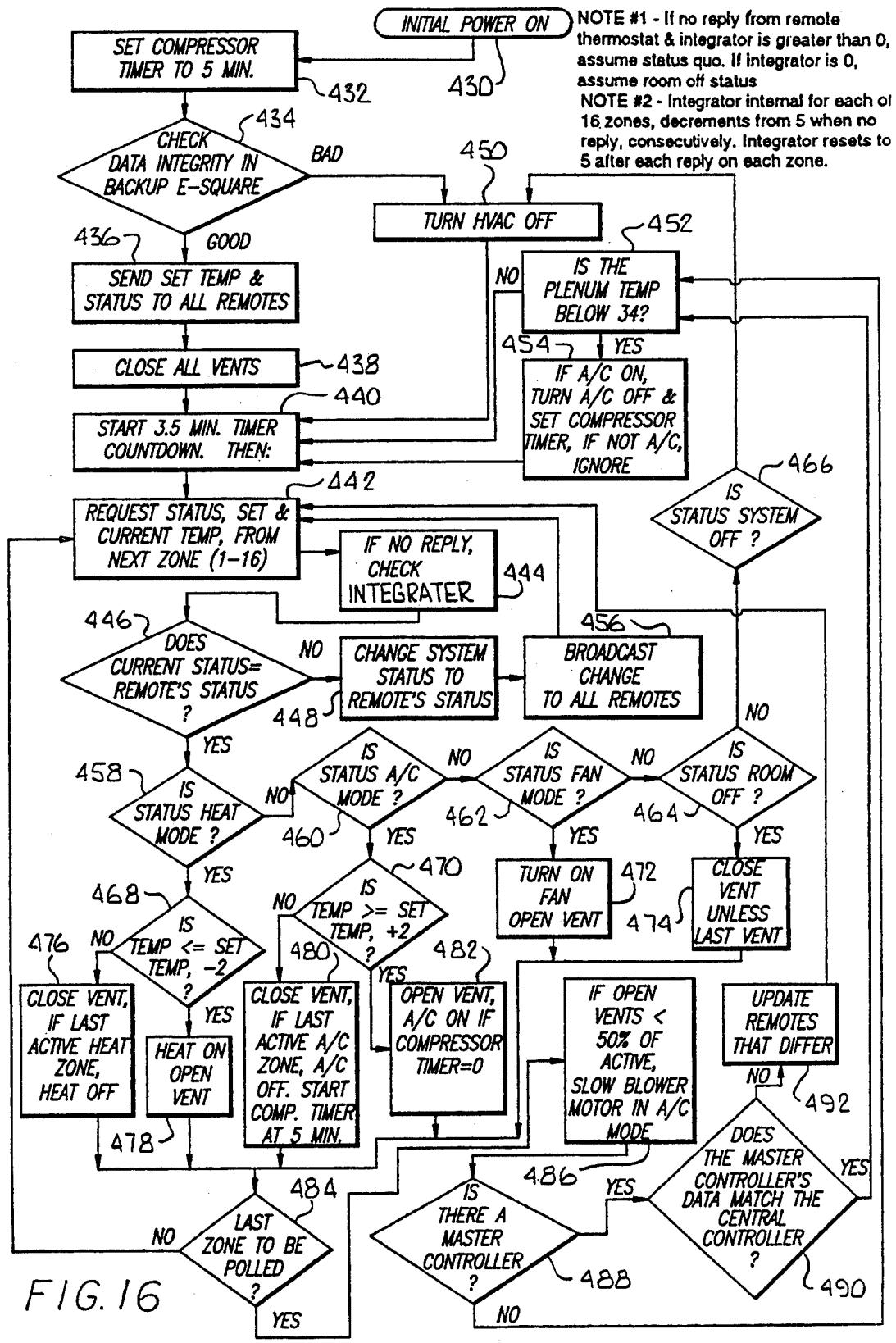
FIG. 16 is a block diagram of the program implemented by the Read Only Memory (ROM) of the central controller.

FIG. 15a shows the preferred embodiment of the central controller 60 in a hardwired system 26. FIG. 15b details the preferred embodiment of the central controller 60 in a radio controlled system 26. FIG. 16 shows the preferred embodiment of a sequence of steps that the central controller 60 takes to accomplish its functions. The steps may be dictated by a program in the memory (390 and 400) of the central controller 60. FIG. 18 details the communication "instructions" and "responses" used by the central controller 60.

A. Control Circuit

As shown in FIG. 15a and 15b, the central controller 60 is equipped with a microprocessor 400 which has its timing controlled by a quartz timing crystal 416. Extra non-volatile memory is provided by an EEPROM 390, for back-up purposes as disclosed hereinabove. The preferred program stored in ROM is discussed below in connection with FIG. 16.

Information regarding the temperature is supplied by a thermistor 394. The thermistor 394 changes resistance according to temperature. A constant current 392 is supplied to the thermistor, and the varying output voltage is then converted from analog to digital form by a serial A/D convertor 398. The reference circuit 396 emits a constant 2.5 volts as a frame of reference for the system to calibrate the circuit and reliably determine the proper temperature. Other information relevant to the microprocessor includes a power up reset 386, and a house code switch 388.

The microprocessor 400, based on information it receives from the room thermostats 50 and the master controller 70, controls the furnace and air conditioner 44. This is done by three triac units 404 which control the heat, air, and fan (406, 408, and 410). The microprocessor 400 can also control the speed of the fan by using a motor speed control unit 402 to control the HVAC 426.

FIG. 15a specifically embodies the configuration of a central controller 60 which is hardwired to the system 26. The register servos 80 are hardwired (414 to 96, 415 to 97, and 413 to 95 as shown in FIG. 15a and FIG. 10) in queue fashion 412 to the microprocessor 400. This enables the central controller 60 to poll the register servos one at a time. The microprocessor 400 communicates to the room thermostats 50 via a quartz crystal 418 controlled modem 384 which sends out signals via standard AC wiring 420. The AC wiring 420 is also connected to a transformer 382 which in turn is connected to a power supply 380 which supplies power to the central controller 60.

FIG. 15b shows the radio controlled embodiment of the central controller 60. Communication to the master controller 70, the room thermostats 50, and the servo controlled registers 30 is done using radio signals. The microprocessor 400 sends and receives signals to and from a 900 MHz receiver/transmitter 424 which uses spread spectrum logic and over an antenna 422 to an appropriate device. Signals from these devices are received through the antenna 422 and the 900 MHz receiver/transmitter 424 and return to the microprocessor 400 for processing. This radio controlled central controller 60 is powered by standard house AC wiring 420. The power goes through a transformer 382 to a power supply 380 which supplies power to the central controller 60.

B. Control Steps

FIG. 16 is a block diagram of a preferred embodiment of the program contained in the ROM of the central controller 60. Once the power has been turned on 430 the compressor timer is preferably set to five minutes 432. This five minute period allows the pressure in the compressor to equalize and thereby prevents damage to the compressor. A check may then be done on the data integrity and the backup EEPROM 434. If the check comes out "bad," the HVAC is turned off 450. If, however, the check comes out "good," then the temperature setting and status is sent to all the remote register units 436. A signal is then sent out to the servo controlled registers 30 so that all the vents are closed 438. The timer is then set for a 3.5 minute countdown 440.

After the countdown, a loop is preferably begun which requests the status, the temperature setting, and the current temperature from the zone (1-16) at which the loop is working 442. If there is no reply from the current zone, the program looks at the integrator of the current zone 444. Each of the 16 zones has an integrator which resets to 5 after each reply on the zone. If, however, there is no reply, the integrator is decremented by 1. Each time there is no reply from the current zone remote thermostat, and the integrator is greater than zero, the program may assume the status quo. If, however, the integrator is zero, the program may assume the room is off status.

The program may then check to see if the current status of the system equals the remote status 446. If the current status does not equal the remote status, then the system status may be changed to the remote status 448, the change may be broadcasted to all of the remotes 456, and the next zone (1-16) may receive a request for status, setting, and current temperature 442 from the system. If, however, the current status equals the remote status 446 then the program reacts based on that status (458, 460, 462, 464, and 466).

If the status of the system is the heating mode 458 then the program preferably looks to see if the temperature is less than or equal to the set temperature by 2° or more 468. If it is less than the set temperature by 2° or more and the heat is on, then the system may open the vent 478. If it is not less than the set temperature by 2°, the vent may be closed 476. However, if this is the last active heat zone, the heat may be turned off 476.

If the status of the system is the air conditioning mode 460, then the program may compare to see if the temperature is greater than or equal to the set temperature by more than 2° 470. If the temperature is greater than the set temperature by more than 2°, the vent may be opened and the air conditioning may be turned on if the compressor timer is equal to zero 482. If the temperature is not greater than or equal to the temperature by 2°or more, then the vent may be closed. If this is the last active air conditioning zone, the air conditioning may be turned off and the compression timer is preferably started at five minutes 480.

If the status is set to the fan mode 462, then the fan may be turned on and the vent may be opened 472. If the status is set so that the room is turned off 464, then the vent may be closed, unless it is the last vent polled 474. If the status of the system is that the system is turned off 466, then the entire heating, ventilation, and air conditioning (HVAC) may be turned off 450.

If this is not the last zone to be polled 484, then the next zone may be looked at 442. However, if this is the last zone to be polled 484 and the number of active vents is less than 50% of the total vents, then the slow blower motor may be turned on if the system is in the air conditioning mode 486. The system may then look to see if there is a master controller 488 included in the system. If there is a master controller, the program may look to see if the data in the master controller matches the data in the central controller 490. If it does not match, then the remotes that differ are updated 492 and the next (first) zone is examined 442. If the data in the master controller matches the data in the central controller 490, the program may then look to see that the plenum temperature is below 34° 452. If there is no master controller 488, the system immediately checks the plenum temperature 452.

If the plenum temperature is not below 34°, then the timer countdown may be started at 3.5 minutes 440. If the plenum temperature is below 34° 452, if the air conditioning is on, then it is turned off and the compressor timer may be set 454. If, however, the air conditioner is not on, then this step may be ignored. Either way, the timer countdown is preferably set to 3.5 minutes.

C. Control Communications

As mentioned above, the central controller 60 may communicate with the thermostats 50, the master controller 70 and the register units 30 via radio signals or through house AC wiring and hardwiring run through the air ducts.

The actual signals would preferably be analog signals. For example, FIG. 17b represents an analog high frequency signals transmitted over AC 120 volts house wiring. The figure shows a signal which represents a one 508 and a signal which represents zero 510. FIG. 17a represents the analog signals converted to digital one 504 and digital zero 506 which corresponding to the analog signals. Digital ones 504 and zeros 506 are strung together to form 8 bit hex words which, in turn, are strung together to form instructions and responses. The instructions are detailed in FIG. 18.

The central controller 60 sends out various instructions. Each instruction preferably has a standard 8 bit starting word, for example, AA. Each instruction transmission preferably has a standard 8 bit ending word, for example, BB. The instruction preferably includes an 8 bit word indicating the instruction type. Other 8 bit words which may be included in an instruction are the house code, a vent or register code, a status code, an offset code, a parity or check sum (cksum) code, a new temperature setting code, and a master controller code. Instruction types may include a request status, an update status, a broadcast command (to all thermostats), a temperature set offset (which would be done at the factory to calibrate the variation found in silicon chips), a query for the master controller, and instructions to the master controller. This list is meant to be exemplary, and is not meant to be limiting.

The thermostat 50 may send responses to the central controller 60 by a similar string of 8 bit hex words. The response may begin with a standard 8 bit hex word different from the starting word of the central controller instruction, for example, 55. The transmission may end with a standard 8 bit word, for example, BB. Other 8 bit words in a thermostat response may include a house code, a thermostat code, a status code, a temperature set code, a current temperature code, and a parity or check sum code. If there was more than one type of thermostat response, a response "type code" may also be included.

The master controller 50 may send responses to the central controller 60 by a similar string of 8 bit hex words. The response may begin with a standard 8 bit hex word different from the starting words of the central controller instruction or the thermostat response, for example, CC. The transmission may end with a standard 8 bit word, for example, BB. Other 8 bit words in a master controller response may include a house code, a thermostat count code, a status code, a temperature set code, and a parity or check sum code. If there was more than one type of master controller response, a response "type code" may also be included.

VI. Conclusion

In conclusion, it is to be understood that the present invention is not to be limited to that precisely as described hereinabove and as shown in the accompanying drawings. More specifically, the exterior frame 32 may be a molded unit, the side units 38 of the exterior frame 32 may be made of extruded metal, the power assembly 81 may be replaced by alkaline or nicad batteries, the thermostat units 50 may be hardwired to the central controller 60, the central controller 60 may have a programmable key pad, or the buttons in the thermostat 50 and master controller 70 could be replaced by other known forms of display and control. A simplified system could combine the master 70 and central 60 controllers. Further, the electrical circuits show preferred implementations, but the described functions may be accomplished by other equivalent circuity. The system may also be operated in an "AUTO" mode in which the system recognizes needs for heating and cooling and automatically may switch between heating and cooling modes of operation. Also a master controller may be combined with a zone thermostat. Accordingly, the present invention is not limited to the arrangements precisely as shown and described hereinabove.

What is claimed is:

1. A fully sealing, air conditioning/heating register assembly, comprising:
   an exterior wall-adapting register frame, including extruded L-shaped side members and four corner members mechanically interfitting with said side members to form a rectangular exterior frame;
   said exterior frame being provided with resilient strips for sealing to walls of a building in which said register assembly is to be mounted;
   an inner register unit having a sealable outer frame which mates with the inner sides of said exterior frame;
   said inner register unit including a first array of outer snap-in blades for directing the flow of air into the room with which the register assembly is associated, said outer blades pivotally connected to said outer frame of the inner register unit;
   said inner register unit including a second array of inner vanes for selectively shutting off the flow of air through the register assembly, said vanes or blades being rotatable into fully sealing engagement with the adjacent blades; and
   means for actuating said inner vanes or blades from an open configuration wherein said blades are spaced apart and parallel with one another, to the fully sealed configuration.

2. An assembly as defined in claim 1, wherein said means for actuating said inner vanes is a manual lever.

3. An assembly as defined in claim 1, wherein said means for actuating said inner vanes is electrical.

4. An assembly as defined in claim 3, wherein said electrical means for actuating said inner vanes is a servo driven unit.

5. An assembly as defined in claim 4, wherein said servo driven unit is powered by a self-contained power source, said power source including batteries and a generator and impeller used to recharge said batteries.

6. An assembly as defined in claim 1, wherein said outer frame of said inner register unit includes walls defining an opening, said walls having a perpendicular inner blade ridge or shoulder, the perimeter of said inner blade ridge facing the inner vanes or blades having additional sealing means.

7. A fully sealing register assembly, comprising:
an exterior register frame construction for adapting to different sized duct openings;
an inner register unit having an outer frame which mates with the inner sides of said exterior frame;
said inner register unit including an array of inner vanes or blades for selectively shutting off the flow of air through the register assembly, said inner vanes pivotally attached at each end to the inner facing sides of said outer frame of the inner register unit, said inner vanes being pivoted into fully sealing engagement with the adjacent inner vanes; and
means for actuating said inner vanes from an open configuration wherein said inner vanes are spaced apart and parallel with one another, to the fully sealed configuration.

8. An assembly as defined in claim 7, wherein said inner register unit includes an array of outer blades or vanes for directing the flow of air into the room with which the register assembly is associated, said outer blades pivotally attached at each end to the inner facing sides of said outer frame of the inner register unit.

9. An assembly as defined in claim 7, wherein said means for actuating said inner vanes is a servo driven unit.

10. An assembly as defined in claim 7, wherein said exterior register frame has side members having a substantially uniform cross-sectional configuration and corner members which mechanically interfit with said side members.

11. An assembly as defined in claim 7, wherein said means for actuating said inner vanes is positioned inside said assembly, whereby when said assembly is mounted in a register, said means for actuating said inner vanes is not visible from the room.

12. A sealing register assembly, comprising:
an exterior register frame construction for adapting to different sized duct openings;
an inner register unit which fits within said exterior register frame; said inner register unit including an array of inner vanes or blades for selectively shutting off the flow of air through the register assembly, said inner vanes pivotally attached at each end to the inner facing sides of said outer frame of the inner register unit, said inner vanes being pivoted into sealing engagement with the adjacent inner vanes; and
means for actuating said inner vanes from an open configuration wherein said inner vanes are spaced apart and parallel with one another, to the sealed configuration.

13. An assembly as set forth in claim 12 wherein said exterior register frame is a molded frame.

14. An assembly as set forth in claim 12 wherein said means for actuating said inner vanes is a servo driven unit powered by a rechargeable battery maintained by an impeller and a motor generator.

15. A fully sealing register assembly, comprising:
an exterior register frame having means for adapting to duct openings, said means comprising:
extruded L-shaped side members; and
four corner members;
said corner members mechanically interfitting with said side members to form a rectangular exterior frame, and said exterior frame being provided with resilient strips for sealing to walls of a building in which said register assembly is to be mounted;
an inner register unit having an outer frame which mates with the inner side of said exterior frame;
said inner register unit including an array of inner vanes or blades for selectively shutting off the flow of air through the register assembly, said inner vanes pivotally attached at each end to the inner facing sides of said outer frame of said inner register unit, said inner vanes being pivoted into fully sealing engagement with the adjacent inner vanes; and
means for actuating said inner vanes from an open configuration, where said inner vanes are spaced apart and parallel with one another, to the fully sealed configuration.

16. A fully sealing register assembly, comprising:
an exterior register frame;
an inner register unit including an array of inner vanes or blades for selectively shutting off the flow of air through the register assembly, said inner vanes pivotally attached at each end to the inner facing sides of said outer frame of the inner register unit, said inner vanes being pivoted into fully sealing engagement with adjacent inner vanes; and
means for actuating said inner vanes from an open configuration, where said inner vanes are spaced apart and parallel with one another, to a fully closed configuration;
said means for actuating said inner vanes being a servo driven unit powered by a self-contained power source, said power source including batteries and a generator and an impeller to recharge said batteries.

17. A fully sealing register assembly, comprising:
an exterior register frame; and
an interior register unit having an outer frame which mates with the inner side of said exterior frame;
said inner register unit including an array of inner vanes or blades for selectively shutting off the flow of air through the register assembly, said inner vanes pivotally attached at each end to the inner facing side of said outer frame of said inner register unit, said inner vanes being pivoted into fully sealing engagement with adjacent inner vanes;
said outer frame of said inner register unit including walls defining an opening, said walls having a perpendicular inner blade ridge or shoulder, the perimeter of said inner blade ridge facing the inner vanes having additional sealing means.

18. An assembly as defined in claim 17, wherein said additional sealing means is a compliant strip of foam rubber.

* * * * *